United States Patent [19]

Hirakawa

[11] Patent Number: 5,491,397
[45] Date of Patent: Feb. 13, 1996

[54] MOTOR DRIVE DEVICE USING ONE-TWO PHASE EXCITATION

[75] Inventor: Hiroyuki Hirakawa, Kyoto, Japan

[73] Assignee: Murata Kikai Kabushiki Kaisha, Kyoto, Japan

[21] Appl. No.: 51,630

[22] Filed: Apr. 22, 1993

[30] Foreign Application Priority Data

Apr. 30, 1992 [JP] Japan ..................... 4-111521
May 11, 1992 [JP] Japan ..................... 4-117315

[51] Int. Cl.⁶ .................................................. H02P 8/00
[52] U.S. Cl. .............................. 318/696; 318/685
[58] Field of Search ........................ 318/685, 696

[56] References Cited

U.S. PATENT DOCUMENTS

| | | | |
|---|---|---|---|
| 4,164,696 | 8/1979 | Kastilahn et al. ................... | 318/696 |
| 4,164,697 | 8/1979 | Everett ................................ | 318/696 |
| 4,172,990 | 10/1979 | Everett et al. ..................... | 318/696 X |
| 4,221,001 | 8/1980 | Heeren ............................... | 318/696 X |
| 4,471,282 | 9/1984 | Moriguchi .......................... | 318/696 |
| 4,642,544 | 2/1987 | Forumura et al. ................. | 318/696 |
| 4,734,631 | 3/1988 | Kimikura et al. ................. | 318/696 X |
| 4,738,209 | 4/1988 | Yanagi et al. ..................... | 318/696 |
| 4,822,619 | 4/1989 | Nagira ................................ | 318/696 X |
| 4,825,133 | 4/1989 | Tanuma et al. ................... | 318/696 X |
| 4,869,610 | 8/1989 | Nishizawa et al. ............... | 318/685 X |
| 4,918,365 | 4/1990 | Tanuma et al. ................... | 318/696 X |
| 4,959,601 | 7/1990 | Kikugawa .......................... | 318/685 X |
| 5,029,264 | 7/1992 | Ito et al. ............................ | 318/696 |
| 5,032,779 | 7/1991 | Takahashi .......................... | 318/696 |
| 5,061,888 | 10/1991 | Hiraka ................................ | 318/696 |
| 5,105,140 | 4/1992 | Matthews et al. ................. | 318/696 |
| 5,175,482 | 12/1992 | DeGuchi ............................ | 318/696 |

Primary Examiner—David S. Martin
Attorney, Agent, or Firm—Loeb and Loeb

[57] ABSTRACT

This invention relates to a motor drive device for a stepping motor used for equipment such as facsimile machine, a scanner and a printer. The motor drive device changes an excitation phase of the stepping motor in response to a motor drive instruction signal sent from a control circuit of the equipment. The motor drive device includes a register for receiving and storing data about delay times and excitation ratios sent from the control circuit of the equipment. The motor drive device changes the excitation phase of the stepping motor in accordance with the data stored in the register. The motor drive device can shorten equipment design period and reduce manufacturing cost. Further, the motor drive device can improve image reading resolution and image recording qualities.

1 Claim, 14 Drawing Sheets

MOTOR DRIVE DEVICE USING ONE-TWO PHASE EXCITATION

BACKGROUND OF THE INVENTION

1. Technical Field

The present invention relates to a device suitable for driving a stepping motor used to feed a document or recording paper in a sub-scanning direction in a facsimile machine, a scanner, a printer or the like.

2. Background Art

In a facsimile machine, generally a density of sub-scanning lines in the document scanning is 3.75 lines/mm, 7.7 lines/mm or 15.4 lines/mm. Scanning or recording at a 3.75 lines/mm density is called "normal mode", that at a 7.7 lines/mm density is called "fine mode" and that at a 15.4 lines/mm density is called "superfine mode" in the art. The sub-scanning line density of the fine mode is twice that of the normal mode. In other words, an amount of document feed between lines in the fine mode is half that in the normal mode.

A stepping motor is considered the best device for feeding the document or recording sheet in a facsimile machine. This is because the stepping motor can be rotated at a desired step and because a half step movement becomes possible by switching a two-phase excitation to a one-two phase excitation. For example, the stepping motor can feed the document or recording sheet at one step of the two-phase excitation in the normal mode whereas it can feed the same at a half step of one-two phase excitation in the fine mode. A motor drive device is connected with the stepping motor and a motor drive circuit of the motor drive device excites the stepping motor. The motor drive device two-phase excites the stepping motor in the normal mode and one-two phase excites the same in the fine mode on an instruction from a CPU of the facsimile machine.

When the conventional motor drive device performs the one-two phase excitation of the motor, a hardware structure determines a time ratio of one phase excitation to two-phase excitation, e.g., the one phase excitation time and the two-phase excitation time are fixed to the same period. Such a conventional motor drive device has various problems as will be explained below.

In order to prevent, for instance, the facsimile machine's image scanning from being affected by the rotating motor, it is required to reduce mechanical vibrations of the motor as much as possible. Generally, the mechanical vibrations of the motor are determined by a mechanical structure of the facsimile machine, in which the motor is incorporated, and the motor excitation period.

The mechanical structure of the facsimile machine constitutes a vibration structure. The mechanical structure of the facsimile machine has a national frequency which is determined by inertia of the stepping motor itself, inertia of rollers driven by the stepping motor to feed a paper in a sub-scanning direction, friction between the rollers and a document or a recording sheet and characteristics of gears or belts connecting the stepping motor with the rollers. When the natural frequency coincides with a drive frequency of the stepping motor or n times thereof, the mechanical structure of the facsimile machine resonates with the stepping motor.

Therefore, even if the use of a motor drive mechanism having an excitation time ratio of 1 to 1 (one phase excitation time to two-phase excitation time), for example, in a certain facsimile machine does not result in significant vibrations, the use of the same motor drive mechanism in a different facsimile machine might result in considerable vibrations because of the mechanical structure of the latter facsimile machine.

In a conventional motor drive mechanism, the one phase/two-phase excitation time ratio is generally determined and fixed by a hardware of the motor drive mechanism. Thus, it is impossible to adjust the excitation time ratio when a single motor drive device is used for different kinds of mechanical structures and large vibrations are produced in a certain type of facsimile machine.

The vibrations of the mechanical structure of the facsimile machine raise two problems. One is that the facsimile machine produces noises which in turn make users displeased. The other is that the vibrations of the mechanical structure are unavoidably transmitted to the document and image sensors. Because of these vibrations, the facsimile machine cannot clearly read an image. In another case, the vibrations may propagate to a thermal print head and a thermosensitive paper so that the facsimile machine cannot perform clear image recording.

Particularly, the one-two phase excitation of the motor is mostly performed when the facsimile machine is set to the fine mode which requires better image quality than usual. Accordingly, the image quality degradation due to the vibrations during the one-two phase excitation is a serious problem.

To prevent the vibrations of the motor, conventionally a wide variety of motor drive devices are prepared. Specifically, the motor drive devices having excitation ratios suitable for various kinds of facsimile machines are prepared and a particular motor drive device is installed in a particular facsimile machine. However, this lowers the manufacturing efficiency of the facsimile machines and raises cost.

The above problem also occurs in other equipment such as scanners and printers.

When the facsimile machine finishes the scanning of one line of a document in a main scanning direction, the motor drive device conducts a predetermined step drive of a document feed stepping motor in response to a motor drive instruction from a CPU. Also, upon the completion of one line recording on a thermosensitive paper, the motor drive device conducts a predetermined step drive of a thermosensitive paper feed stepping motor in response to a motor drive instruction from a CPU.

However, when the motor drive device drives the stepping motor immediately after it receives the motor drive instruction, the mechanical structure of the facsimile machine sometimes resonates with the stepping motor, as mentioned earlier. It is known through experience that driving the stepping motor with a certain time delay after the motor drive instruction can eliminate the problem of resonance.

The above-mentioned certain time delay has another meaning: even if the mechanical structure vibrations do not occur, microscopic vibrations take place in the document. This will be explained with FIG. 14 of the accompanying drawings. FIG. 14(a) shows a read instruction signal from a CPU, FIG. 14(b) shows a motor drive instruction signal and FIG. 4(c) shows an excitation phase. In the illustration, numerals a1 and a2 indicate charging periods of an image sensor (CCD), respectively. The image sensor outputs image data, which has been read during a previous charging period, in response to the read instruction signal. The stepping motor ideally feeds the document as shown in FIG. 14(d). However, various factors such as the starting property (performance) of the stepping motor itself, mechanical transmission delay between the stepping motor and the rollers and friction and slippage between the rollers and the document cause the microscopic vibrations d1 and d2, as shown in FIG. 14(e), when the stepping motor feeds the document.

It is understood from FIGS. 14(b) and 14(c) that the motor drive device changes the excitation phase as it receives the motor drive command. In other words, the motor drive device carries out the one step drive of the stepping motor upon receiving the motor drive command. It is understood from FIGS. 14(a) and 14(e) that the microscopic vibrations d1 and d2 occur during the charging periods a1 and a2 of the image sensor. This implies that the image sensor outputs image data which is derived from a vibrating document. It is impossible for a printer of the facsimile machine to reproduce a clear image from such image data.

In FIG. 14(f), the motor drive device changes the excitation phase (or performs one step drive of the stepping motor) with a predetermined time delay Td after the motor drive command. In this case, the document moves as shown in FIG. 14(g) and microscopic vibrations f1 and f2 arise outside the image sensor charging periods a1 and a2. This implies that the image sensor reads the document with no microscopic vibrations and therefore the printer of the facsimile machine can reproduce a clear image.

The delay time Td of the conventional motor drive device is determined by experiments and a timer (hardware) for embodying the delay time Td is incorporated in the motor drive device. However, since this motor drive device is designed for a facsimile machine having a particular mechanical structure, the application of this motor drive device to a facsimile machine having another mechanical structure may not work satisfactorily. This is because the delay time Td of one facsimile machine is generally not equal to that of another facsimile machine.

Conventionally, therefore, the motor drive device having the same numbers as the types of the facsimile machine are prepared and respective motor drive devices are incorporated in corresponding facsimile devices, as mentioned before. This raises cost and lowers the manufacturing efficiency.

SUMMARY OF THE INVENTION

Regarding the above mentioned problems, the present invention has an object of providing a motor drive device which can be used in various types of equipments such as facsimile machines having different mechanical structures.

Another object of the present invention is to provide a motor drive device which can reduce cost and shorten a period for development of equipments such as facsimile machines.

Still another object of the present invention is to provide a motor drive device which can prevent mechanical vibrations of the equipment so as to improve image reproductivity.

A motor drive device of the present invention includes a register in which data about one phase excitation time to two-phase excitation time ratios and delay times for stepping motor actuation can be written. After the motor drive device is incorporated in the equipment, a control circuit of the equipment (for example, a CPU of a facsimile machine) writes the data into the register.

When equipment such as a facsimile machine is designed, an experimental model of a mechanical structure of the equipment is prepared to experimentally determine the one phase excitation time to two-phase excitation time ratio and the motor actuation delay time. The data about the excitation time ratio and the delay time obtained in this way are added as data to a program of a control circuit of the equipment.

In operational equipment, the control circuit of the equipment writes the excitation time ratio and the delay time into the register of a motor driver device at the appropriate time. In facsimile machines, the "appropriate time" may be right after the turning on of a power supply, when a start key is pressed or after so-called handshake (CCITT Recommendation, T.30).

The motor driver device adjusts the one phase excitation period to two-phase excitation period ratio in accordance with the data written in the register. In addition, the motor driver device changes the excitation phase of the stepping motor at a delayed timing after the motor drive command in accordance with the data written in the register.

DESCRIPTION OF THE PREFERRED EMBODIMENTS

Preferred embodiments of the present invention will be explained with references to the accompanying drawings.

Figure 1:
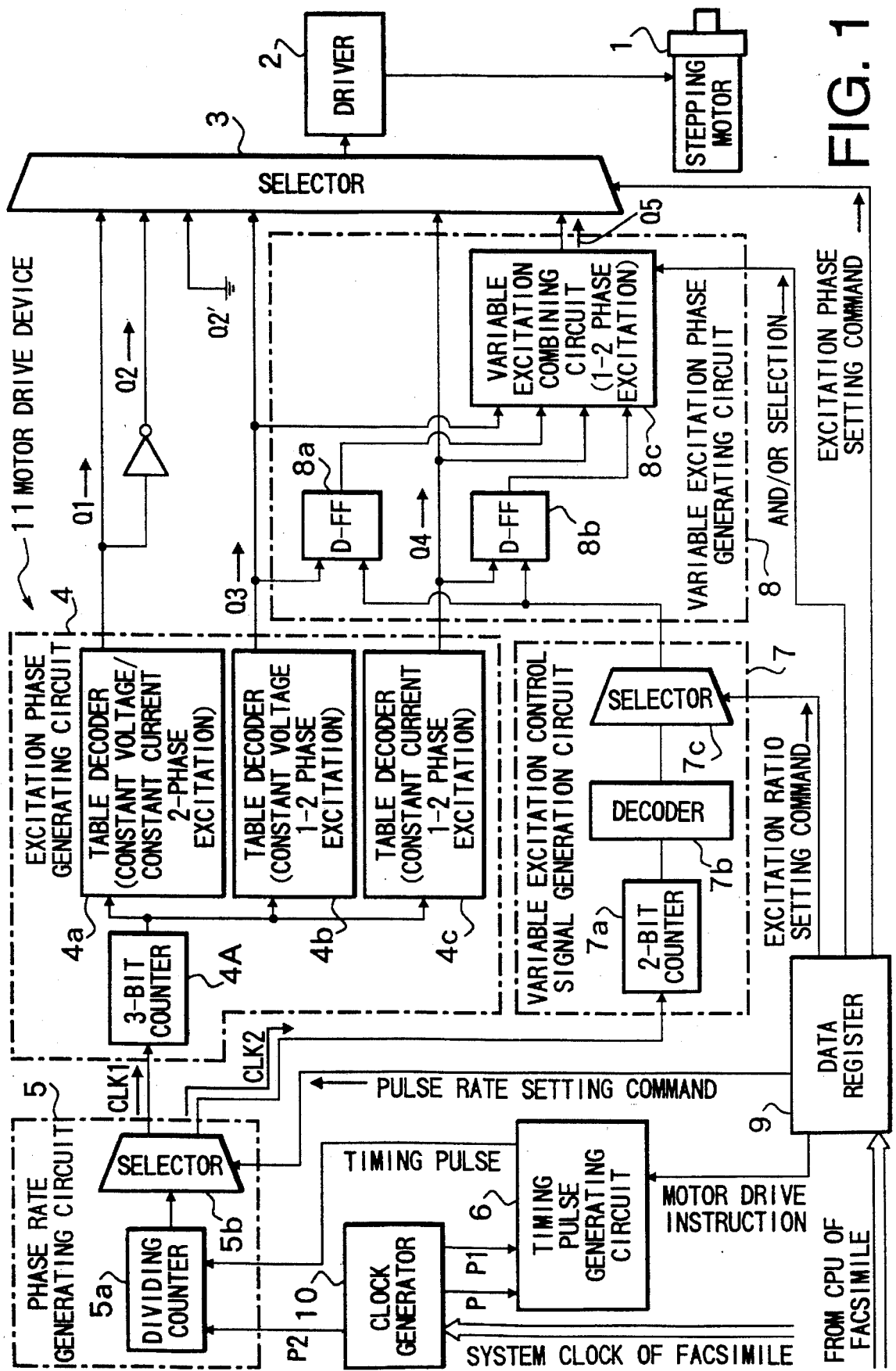
FIG. 1 is a block diagram of the motor driver arrangement according to an embodiment of the present invention.

FIG. 1 is a block diagram showing one example of a hardware structure of a motor drive arrangement 11 according to the present invention.

The illustrated motor drive arrangement 11 is connected with a stepping motor 1 used to feed a document or recording sheet in a facsimile machine and includes, for example, a driver 2 for supplying a drive electrical power to the stepping motor 1 and an excitation phase generating circuit 4 for generating and supplying various kinds of excitation phases for two-phase and one-two phase excitations of constant current and constant voltage to the driver 2 via a selector 3.

In addition to these elements the motor drive arrangement 11 includes a pulse rate generating circuit 5 for feeding a desired pulse rate to the excitation phase generating circuit 4, a timing pulse generating circuit 6, a variable excitation control signal generating circuit 7 for changing an excitation ratio of excitation phases for the one-two phase excitation output from the excitation phase generating circuit 4, a variable excitation phase generating circuit 8, a data register 9 and other elements.

Here, the data register 9 receives an instruction signal from a CPU (signal processor) of the facsimile machine and outputs various control commands to respective elements, as will be explained later.

Figure 2:
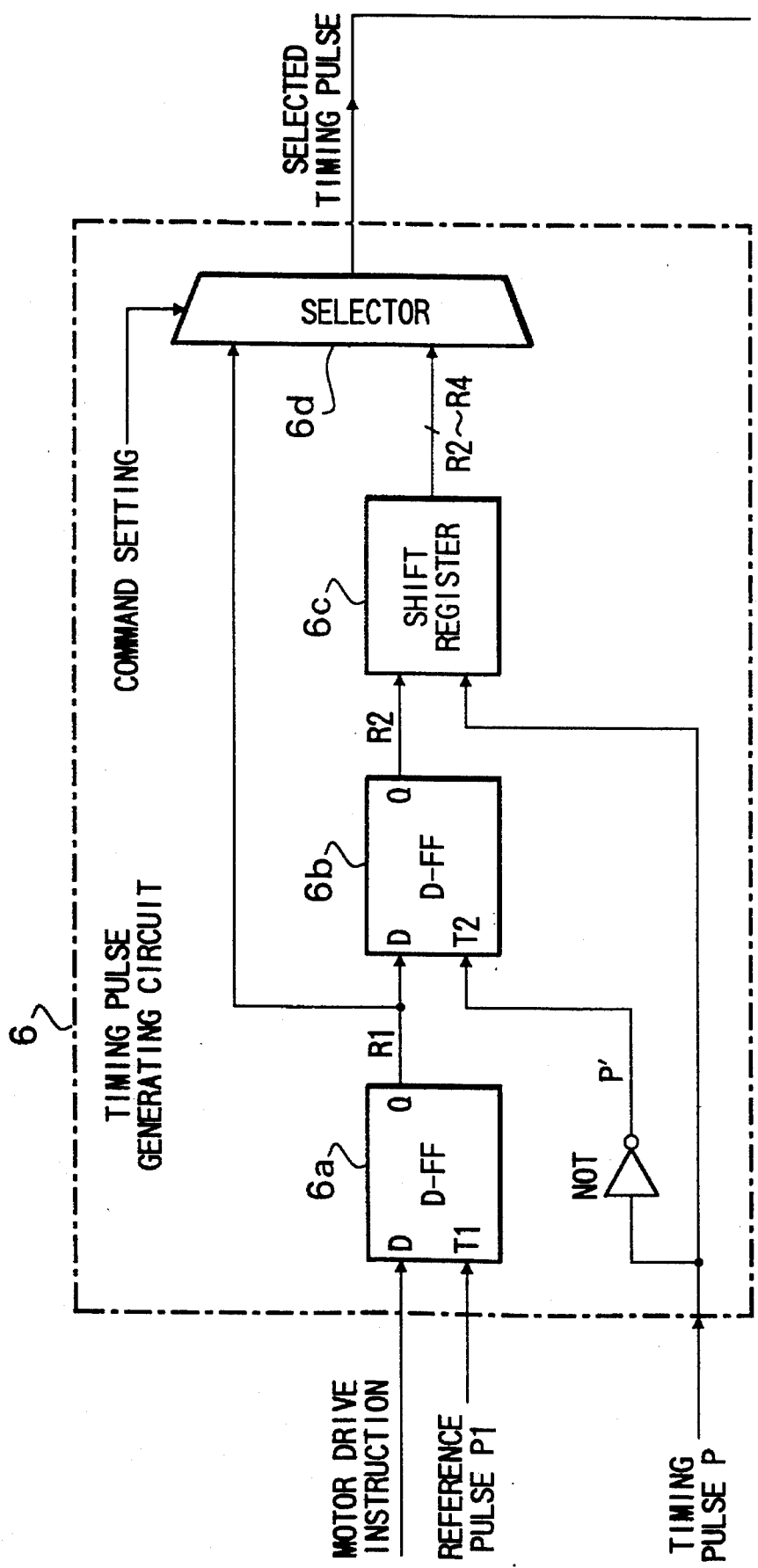
FIG. 2 is a block diagram of a timing pulse generating circuit of a motor drive circuit of the embodiment.

Referring to FIG. 2, the timing pulse generating circuit 6 includes D flip flop circuits 6a, 6b, a shift register 6c, a selector 6d and other elements. The timing pulse generating circuit 6 receives a control command (motor drive instruction) from the data register 9 and a reference pulse P1 and timing pulse P from a separate pulse generating circuit (clock generator) 10. The pulse generating circuit 10 divides a system clock ψ of the facsimile machine to produce the reference pulse P1 and the timing pulse P as well as an internal clock P2 which will be described later.

Figure 4:
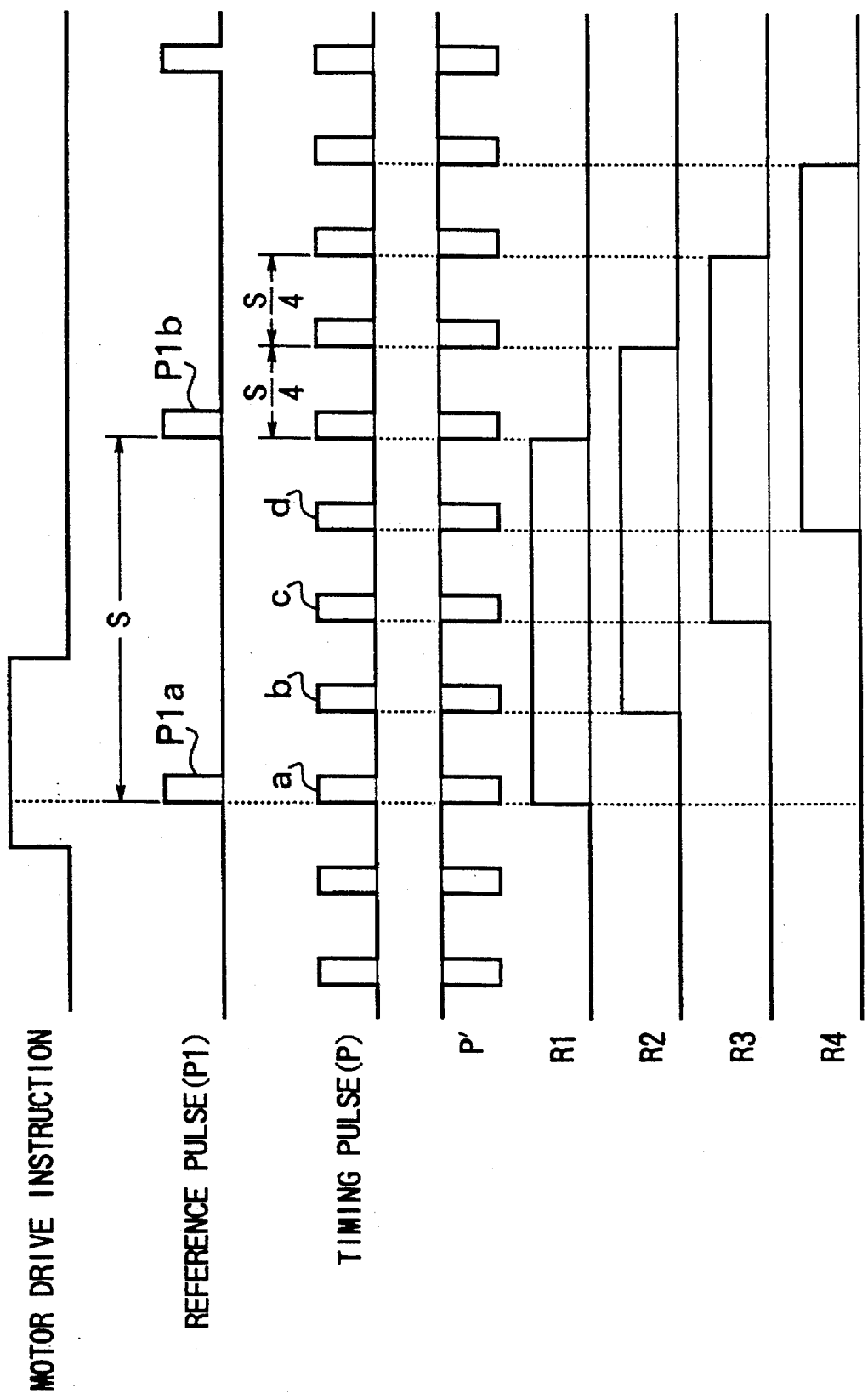
FIG. 4 shows a time chart of the timing pulse generating circuit.

Among these pulses, the reference pulse P1 is a pulse with a constant period S, as shown in FIG. 4, and the period S corresponds to one line processing time by the facsimile machine, i.e., a time from the scan-reading of one line of image to the binary image signal (digital signal) conversion from the scan-read analog data or a time for one line image printing.

A motor drive command from the data register 9 is received by the timing pulse generating circuit 6 and it will become effective (or active) when another reference pulse P1 reaches the timing pulse generating circuit 6. Therefore, a time from the reception of the reference pulse P1a after the motor drive command to the reception of next reference pulse P1b is an effective (active) period for the drive command.

The timing pulse P synchronizes with the reference pulse P1 at a period of quarter S. One previously selected pulse among pulses a–d of the timing pulse P is output from the selector 6d of the timing pulse generating circuit 6. This output timing is the actuation start timing of the stepping motor 1.

The timing pulse generating circuit 6 is adapted to process signals in the manner mentioned below.

Referring back to FIG. 2, an output signal R1 from the D flip flop circuit 6a to which the motor drive command signal and the reference pulse P1 are respectively input and an output signal R2 from the D flip flop circuit 6b to which the output signal R1 and a signal (P' in FIG. 2) of the timing pulse P reversed in a NOT circuit (NOT) have configurations as shown in FIG. 4.

The signal R1 is directly input to the selector 6d and the signal R2 and the timing pulse P are input to the shift register 6c. These data are successively shifted and input to the selector 6d.

Therefore, the selector 6d receives four kinds of timing pulses R1 to R4 (FIG. 4) in turn.

With respect to the reception timing for "a" of the reference pulse P1, the timing pulse R1 has no delay time, the timing pulse R2 has a delay time of S/4, the timing pulse R3 has a delay time of S/2 and the timing pulse R4 has a delay of 3S/4 as shown in FIG. 4.

The selector 6d is designed to output to the pulse rate generating circuit 4 one timing pulse previously selected among these four kinds of timing pulses R1 to R4 in accordance with a command setting made on the facsimile machine side. This timing pulse selection is carried out in accordance with a soft program which is used for the control of the facsimile machine.

The pulse rate generating circuit 5 divides the signal of the internal clock P2 in a dividing counter 5a to produce various kinds of pulse rates (clock signals).

Figure 5:
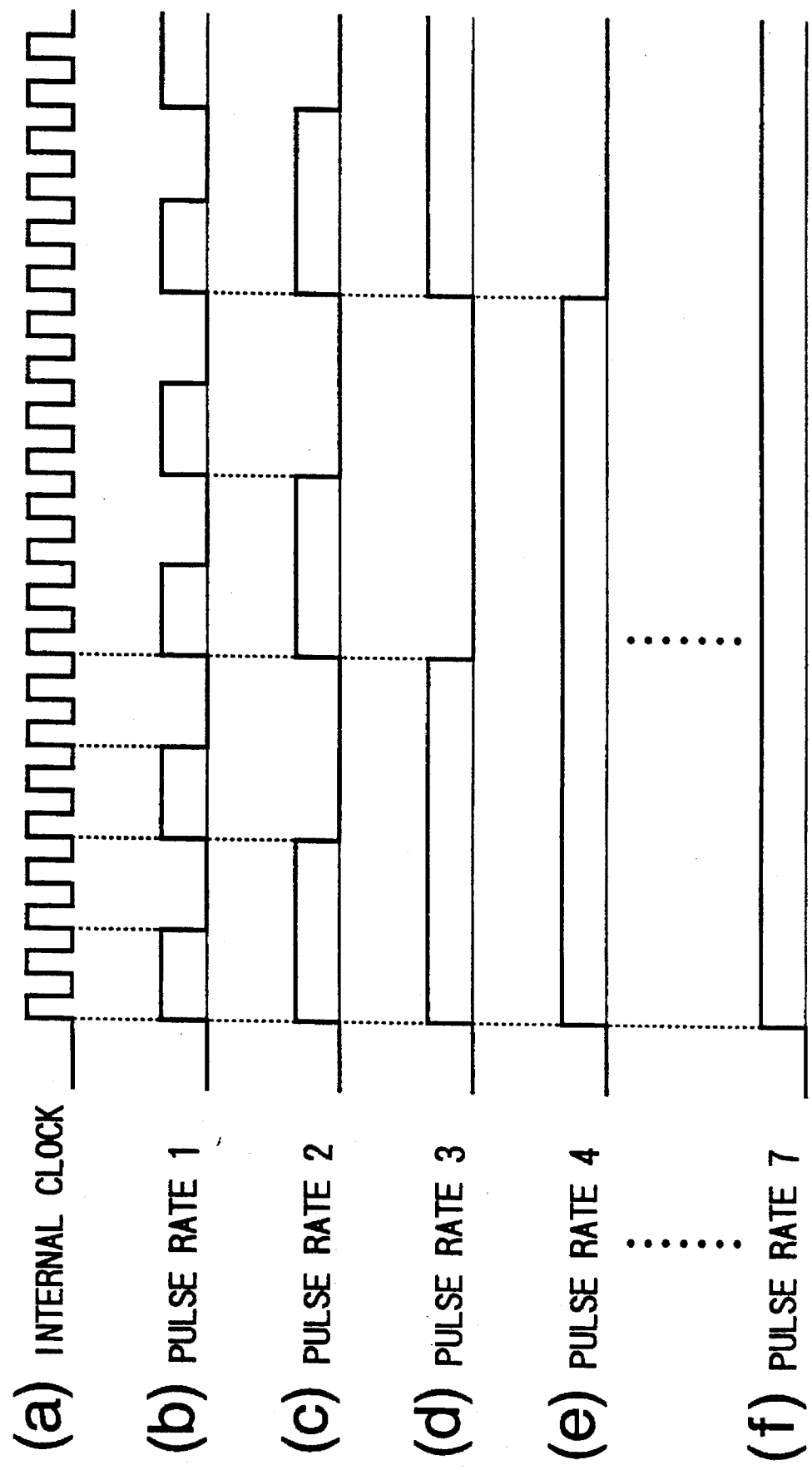
FIG. 5 is a time chart showing an internal clock signal and various pulse rate signals produced by the internal clock signal.

Specifically, the circuit 5 divides the internal clock signal of FIG. 5(a) and produces, for example, seven kinds of pulse rates 1 to 7, as shown in FIGS. 5(b) to 5(f). (Part of the pulse rates are omitted in the illustration.)

The circuit 5 selects two of seven pulse rates 1 to 7 and outputs them from the selector 5b. This selection is carried out in accordance with a control command from the data register 9. The selected two signals are output as pulse rates CLK1 and CLK2, respectively.

Figure 6:
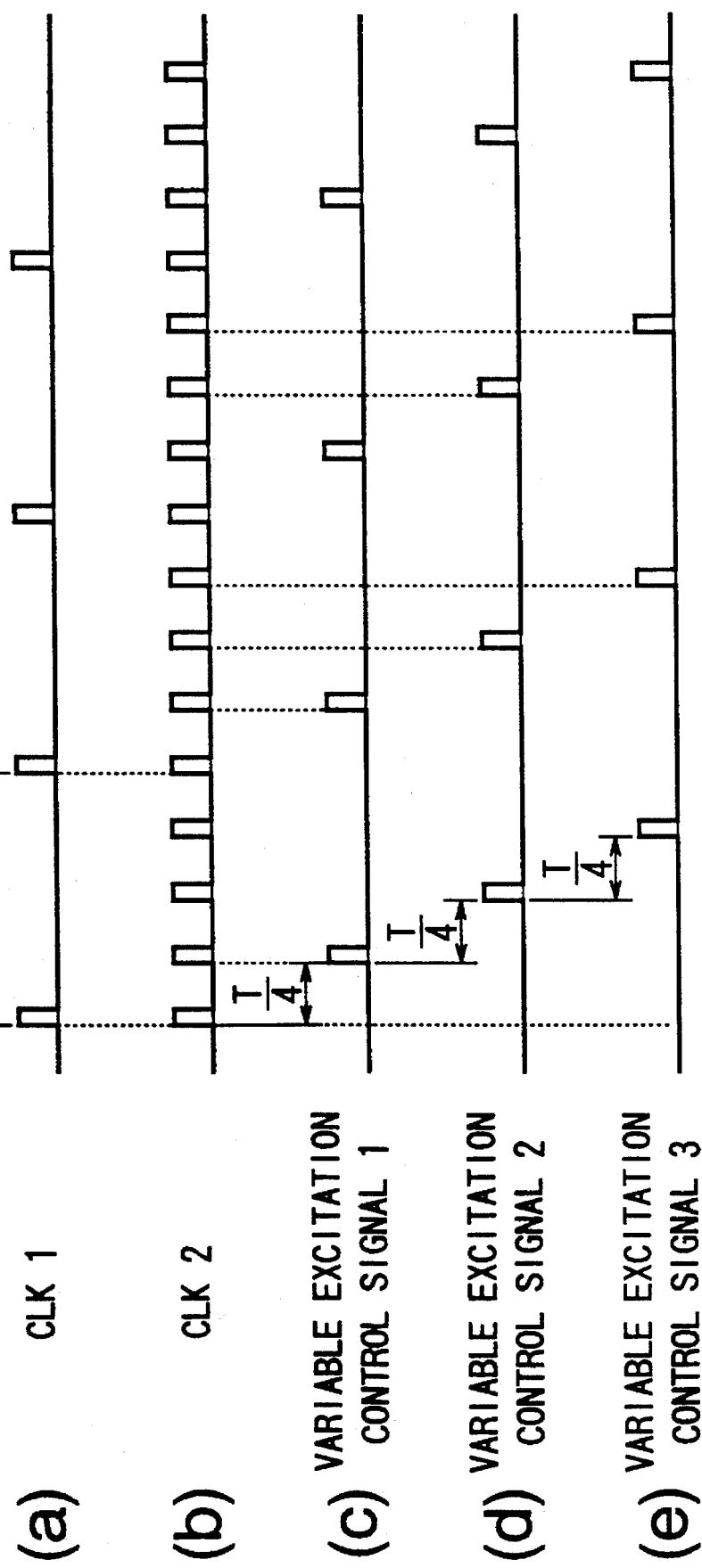
FIG. 6 is a time chart showing pulse rate signals and variable excitation control signals.

Referring to FIGS. 6(a) and 6(b), a rate ratio of the pulse rates CLK1 and CLK2 is determined beforehand. For example, a period of one pulse rate CLK2 may be set to a quarter of period of the other pulse rate CLK1.

Upon receiving the timing pulse from the timing pulse generating circuit 6, the pulse rate generating circuit 5 starts the activation of the internal clock P2 and keeps operating during the period S of the reference pulse P1.

Referring to FIG. 1, the excitation phase generating circuit 4 includes a 3-bit counter 4A and three table decoders 4a to 4c.

Figure 3:
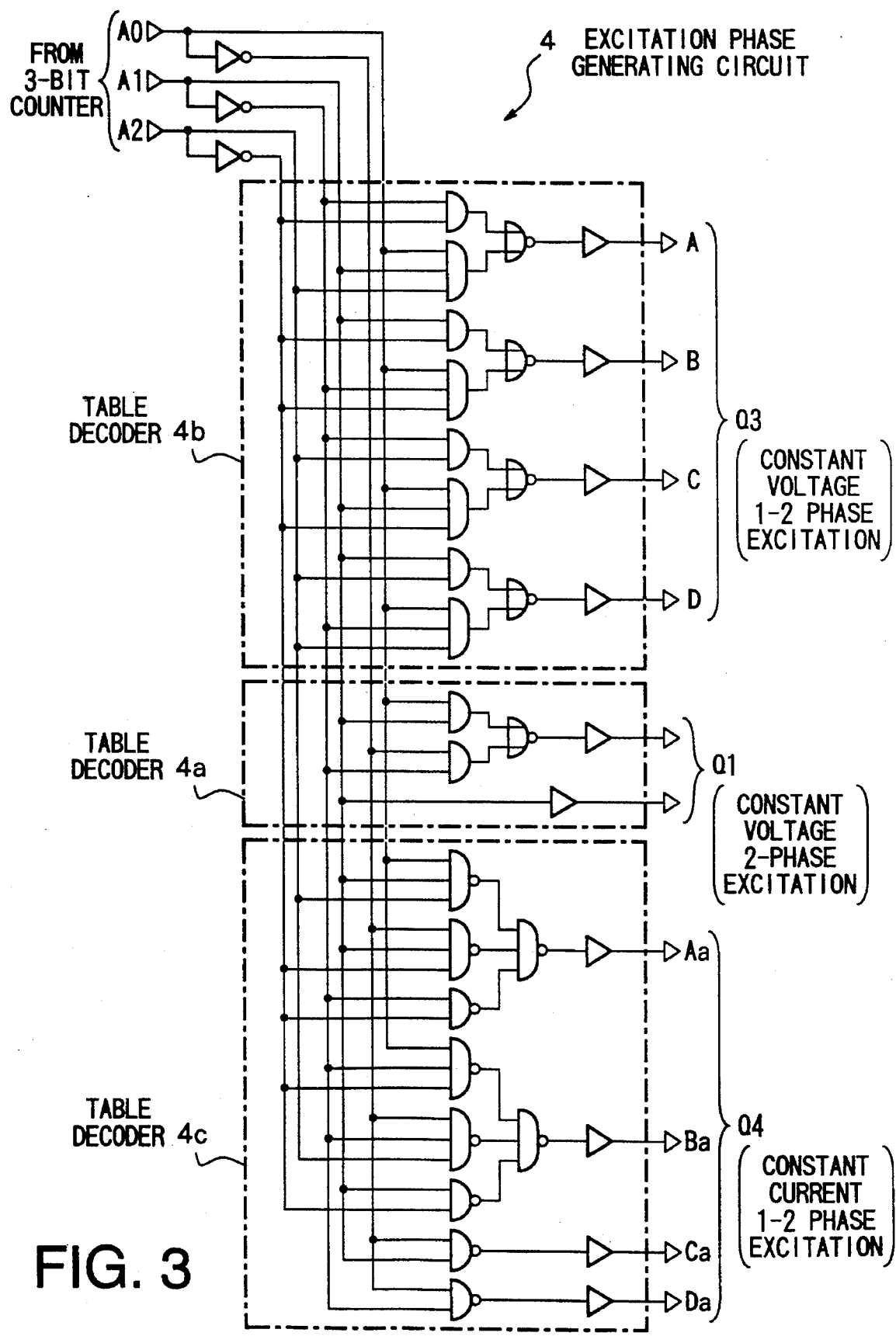
FIG. 3 shows a circuitry of a table decoder of the motor drive circuit of the embodiment.

The 3-bit counter 4A cyclically counts the pulse rates CLK1 from 0 to 7 and outputs count values as 3-bit binary signals A0 to A2 (FIG. 3). Each table decoder 4a (or 4b or 4c) produces a predetermined excitation phase in accordance with such signals from the counter 4A.

FIG. 3 shows an example of hardware structure of the excitation phase generating circuit 4. In accordance with the signals A0, A1 and A2 from the 3-bit counter 4A, the table decoder 4a produces excitation phases Q1 and Q2 (see FIG. 1) for two-phase excitation of constant voltage, the table decoder 4b produces pulses A to D of an excitation phase Q3 for one-two phase excitation of constant voltage and the table decoder 4c produces pulses Aa to Da of an excitation phase Q4 for one-two phase excitation of constant current.

In case of constant current two-phase excitation, the pulse is produced by the phases Q1 and Q2' (earth).

In short, the table decoders 4a to 4e mutually use a set of 3-bit counter 4A, pulse rate generating circuit 5 and a timing pulse generating circuit 6 but produce different excitation phases respectively.

Figure 7:
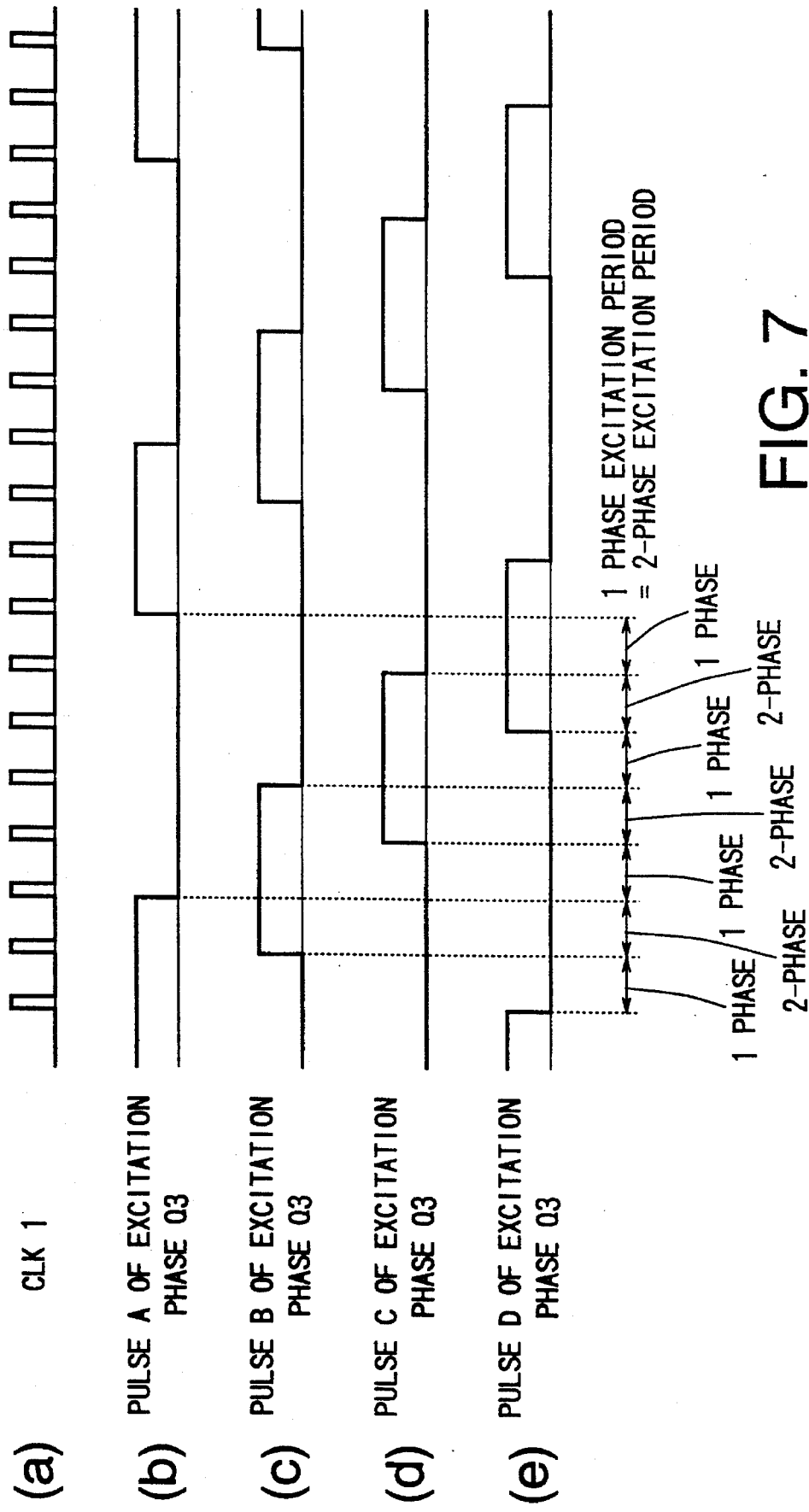
FIG. 7 is a time chart showing pulse rate signals and examples of excitation phases for constant voltage one-two phase excitation produced in an excitation phase generating circuit.

Referring to FIG. 7, illustrated are pulses A to D of the excitation phase Q3 for the one-two phase excitation output from the table decoder 4b for the constant voltage one-two phase excitation.

In the excitation phase Q3 in FIG. 7, the one phase excitation period and the two-phase excitation period are equal to each other so that the excitation ratio thereof is 1:1.

With respect to another excitation phase Q4 for the constant current one-two phase excitation, the excitation ratio may also be 1:1.

Referring back to FIG. 1, the variable excitation control signal generating circuit 7 is provided to produce a variable excitation control signal necessary for changing the excitation ratio of the excitation phases in the one-two phase excitation and includes a 2-bit counter 7a, a decoder 7b, a selector 7c and other elements.

In this circuit 7, three kinds of variable excitation control signals 1 to 3, as shown in FIGS. 6(c) to 6(e) for example, are generated from the pulse rate CLK2 of FIG. 6(b). Among these signals, only one variable excitation control signal of which order is selected by a control command from the data register 9 is output from the selector 7c.

The above mentioned three kinds of variable excitation control signals 1 to 3 are signals with a delay of quarter period (T/4) respectively, where T represents a period of the pulse rate CLK1, as compared with the pulse rate CLK1.

The variable excitation phase generating circuit 8 produces an excitation phase Q5 for a constant voltage or current one-two phase excitation of desired excitation ratio, which is different from the excitation phases Q3 and Q4 for the one-two phase excitation, using the excitation phases Q3 and Q4 in accordance with the variable excitation control signal from the variable excitation control signal generating circuit 7. As shown in FIG. 1, this circuit 8 includes D flip flop circuits 8a, 8b and a variable excitation combining circuit 8c.

Among these elements, the D flip flop circuits 8a and 8b receive the excitation phases Q3 and Q4 for the one-two phase excitation from the table decoders 4b and 4c as their D inputs respectively and synchronize the excitation phases Q3 and Q4 with variable excitation control signals sent from the variable excitation control signal generating circuit 7 so as to delay these phases.

Figure 8:
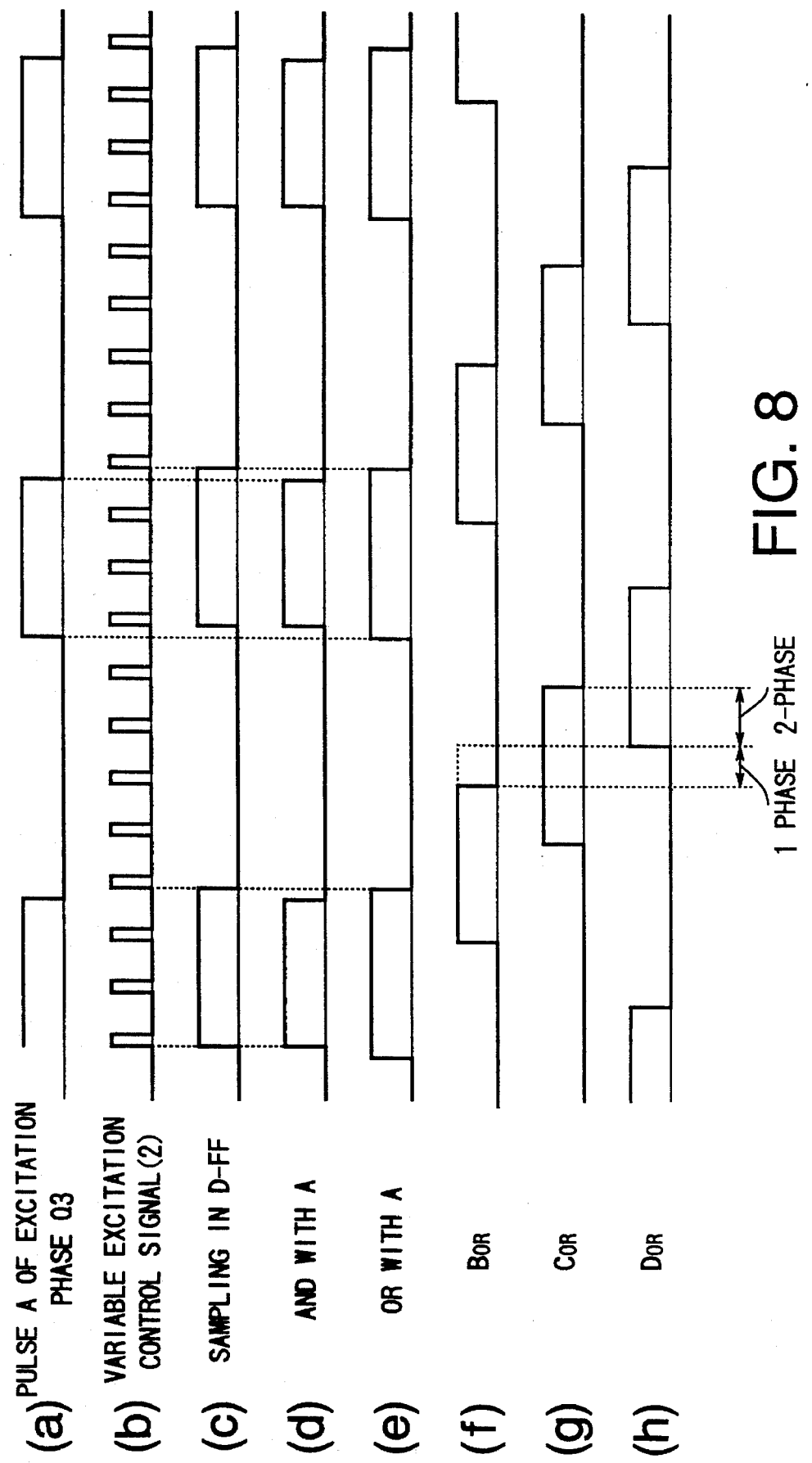
FIG. 8 is a time chart showing a reference pulse for constant voltage excitation phases and constant voltage excitation phase for one-two phase excitation produced in a variable excitation phase generating circuit in accordance with the reference pulse.

Specifically, for example, if a variable excitation control signal 2 of FIG. 8(b) is output from the circuit 7, a pulse A of the excitation phase Q3 for the one-two phase excitation of FIG. 8(a) from the table decoder 4b is delayed by the D flip flop circuit 8a as shown in FIG. 8(c). This delaying process is not limited to the pulse A of the excitation phase Q3, but it is applied to other pulses B to D in a similar manner. Likewise, a similar delaying process may also be applied to the excitation phase Q4 for the constant current one-two phase excitation in the other D flip flop circuit 8b. Therefore, four D flip flop circuits 8a and four flip flop circuits 8b are provided to correspond to four kinds of pulses A to D and four kinds of pulses Aa to Da of the excitation phases Q3 and Q4.

On the other hand, the variable excitation combining circuit 8b produces an excitation phase Q5 which is a logical product (AND) or logical sum (OR) of sampling signals of excitation phases output from the D flip flop circuits 8a and 8b and the excitation phases Q3 and Q4 for the one-two phase excitation respectively output from the table decoders 4b and 4c. The selection of AND or OR is conducted by a control command from the data register 9.

For example, if the OR process is performed on the excitation phase Q3, pulses off the excitation phase Q5 produced in the variable excitation combining circuit 8c become those shown in FIGS. 8(e) to 8(h). The pulses A(OR), B(OR), C(OR) and D(OR) are input to the selector 3 as the excitation phase Q5 for the one-two phase excitation of constant voltage.

Figure 9:
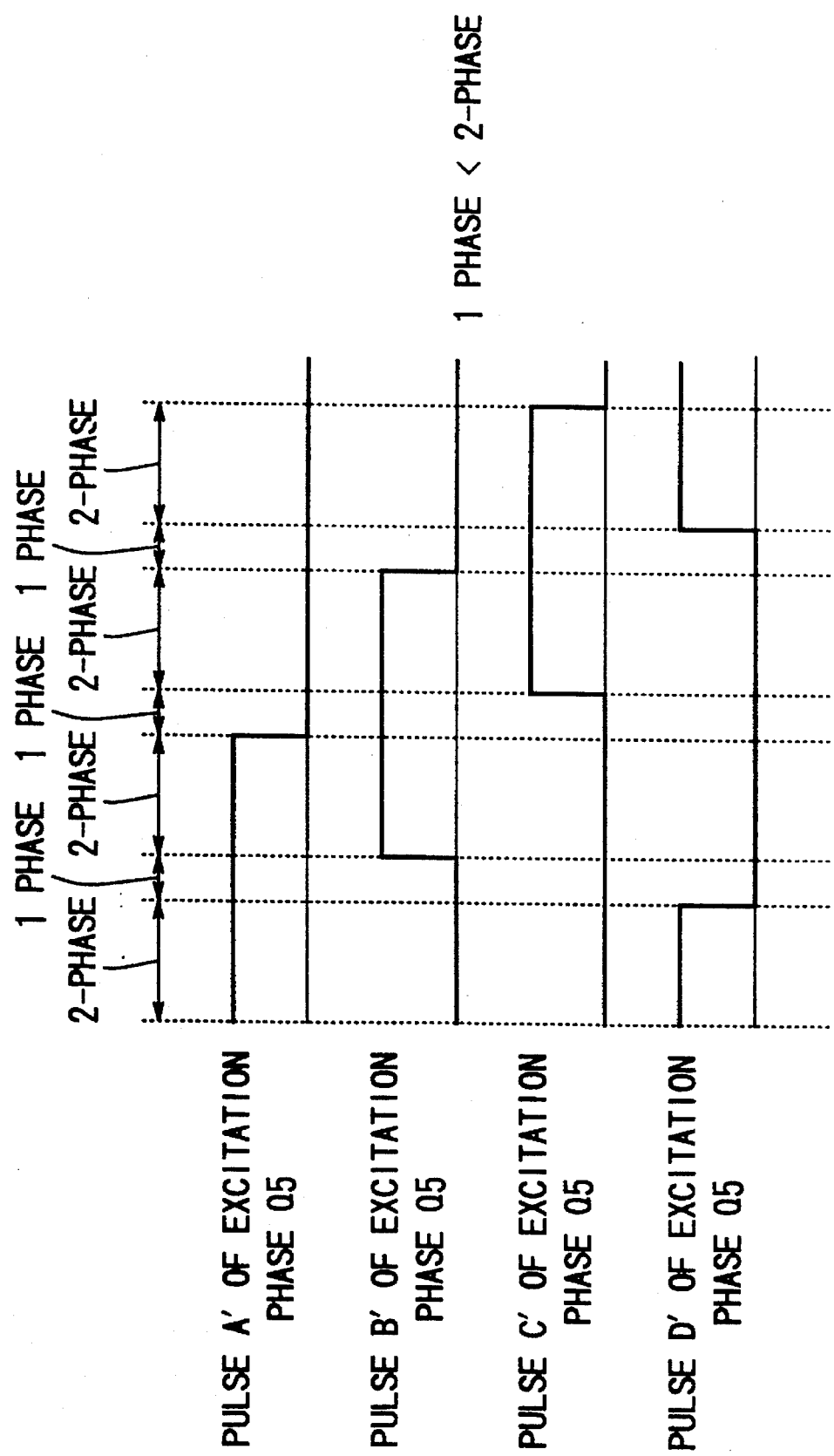
FIG. 9 is a time chart illustrating examples of excitation phases produced in the variable excitation phase generating circuit.

The excitation phase Q5 is a resultant as obtained by delaying the excitation phase Q3 of the pulses A to D which has a one-two phase excitation ratio of 1:1 (this excitation phase Q3 is produced in the decoder 4b.) by T/4 (FIG. 6) in the D flip flop circuit 8a and OR processing the delayed pulse with original reference pulse phases A to D in the variable excitation combining circuit 8c. Therefore, waves of the pulses A(OR), B(OR), C(OR) and D(OR) of the excitation phase Q5 are different from those of A to D of the reference excitation phase Q3. Specifically, in these excitation phases, the two-phase excitation period is longer than the one phase excitation period, like excitation phases A' to D' in FIG. 9.

Figure 10:
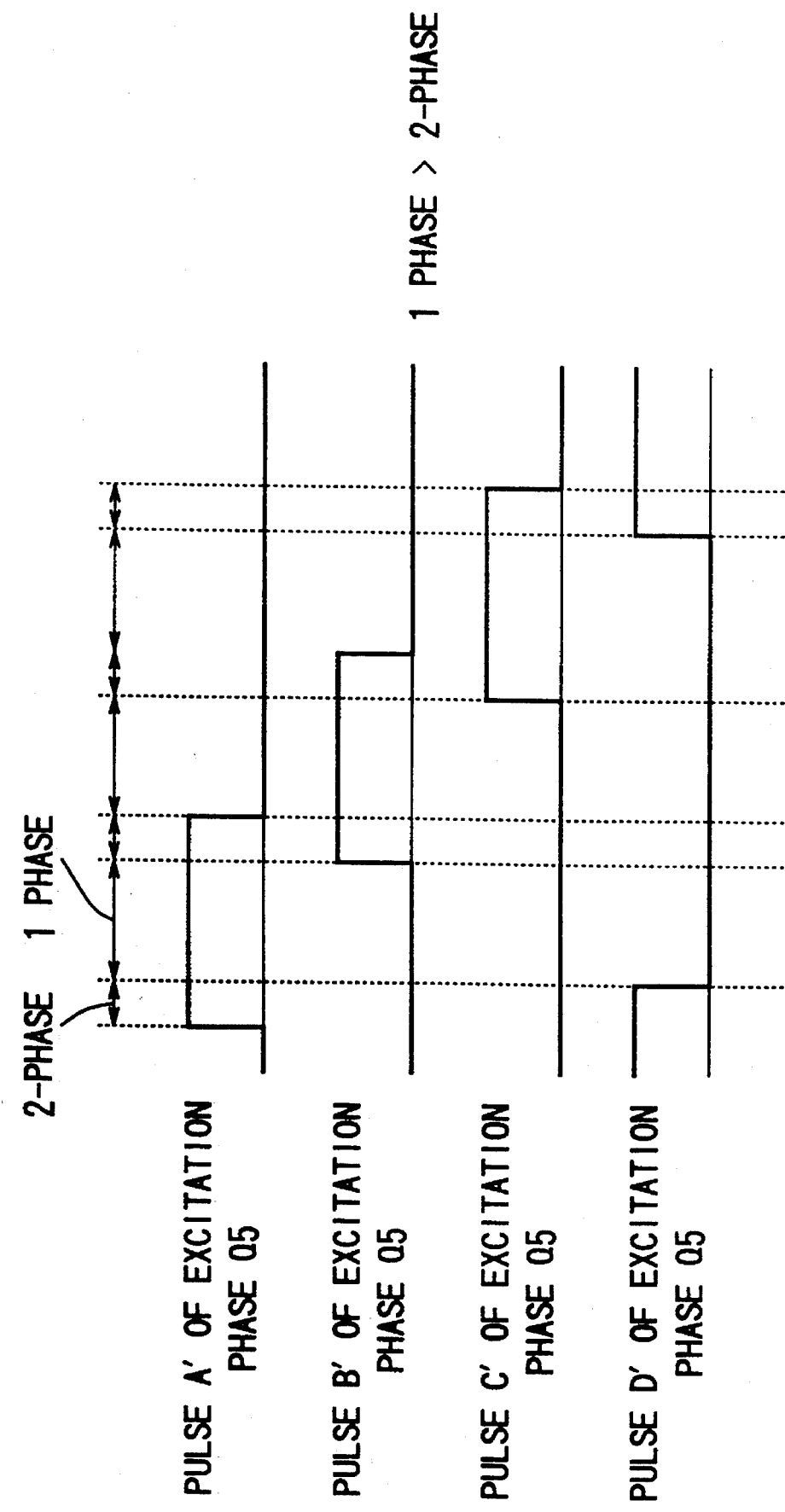
FIG. 10 is a time chart illustrating another example of excitation phases produced in the variable excitation phase generating circuit.

On the other hand, if the AND process is selected and the AND process is carried out in the variable excitation combining circuit 8c, the one phase excitation period becomes longer than the two-phase excitation period, for example, like pulses A' to D' of an excitation phase Q5 in FIG. 10. These phases are input to the selector 3 as-the excitation phase Q5 for a constant voltage one-two phase excitation.

The variable excitation phase generating circuit 8 can also produce excitation phases having different excitation ratios with respect to-the excitation phase Q4 for the constant voltage one-two phase excitation. In summary, therefore, it is possible for the variable excitation phase generating circuit 8 to produce an excitation phase Q5 having a desired excitation ratio, which is different from the excitation ratios of the excitation phases Q3 and Q4, for the constant voltage or current one-two phase excitation.

In this embodiment, the D flip flop circuits 8a and 8b can delay the excitation phases Q3 and Q4 in three stages using one of three variable excitation control signals 1 to 3. Further, the variable excitation combining circuit 8c can perform one of two processes, i.e., AND or OR process, with the excitation phases Q3 and Q4. Therefore, it is possible for the variable excitation generating circuit 8 to produce six kinds of excitation phases having different excitation ratios with respect to the constant voltage one-two phase excitation and the constant current one-two phase excitation, respectively.

The selector 3 outputs to the driver 2 one kind of excitation phase which is selected by a control command sent from the data register 9 among the excitation phases Q1 to Q4 produced in the excitation phase generating circuit 4 and the excitation phase Q5 produced in the variable excitation phase generating circuit 8 and having a different excitation ratio.

Next, the operation of the motor drive device 11 of the embodiment having the above structure will be explained with reference to FIG. 1.

First, a desired pulse rate CLK1 which is selected by a setting command is input to the excitation phase generating circuit 4 from the pulse rate generating circuit 5 which receives a predetermined timing pulse from the timing pulse generating circuit 6. Then, the CLK1 is counted in the 3-bit counter 4A and a plurality of table decoders 4a to 4c produce various kinds of excitation phases in accordance with the count values R0 to R2.

More specifically, the table decoder 4a produces the excitation phases Q1 and Q2 for the constant voltage and current two-phase excitation, the table decoder 4b produces the excitation phase Q3 for the constant voltage one-two phase excitation and the table decoder 4c produces the excitation phase Q4 for the constant current one-two phase excitation, all of which are input to the selector 3.

Therefore, if the stepping motor incorporated in the facsimile machine is desired to be driven in a constant voltage drive mode, the excitation phases (Q1 and Q2) or Q3 is selected among the excitation phases Q1 to Q4 and the selected one is output to the driver 2 from the selector 3. If the scan-reading mode of the facsimile machine is a normal mode (1 step rotation), the excitation phase Q1 for the two-phase excitation is used whereas if the scan-reading mode of the facsimile machine is a fine mode (half step rotation), the excitation phase Q3 for the one-two phase excitation is used.

On the other hand, if the stepping motor is desired to be driven in a constant current drive mode, the excitation phase (Q1, Q2') or Q4 for the constant current two-phase or one-two phase excitation is selected and the selected one is output to the driver 2.

Therefore, although a plurality of decoders 4a to 4c are provided, a set of the timing pulse generating circuit 6, the pulse rate generating circuit 5 and the 3-bit counter 4A are used in combination. This set of elements appropriately copes with four types of motor drive operation, i.e., the constant voltage drive mode or the constant current motor drive mode with the two-phase excitation or one-two phase excitation.

The excitation phases Q3 and Q4 for the one-two phase excitation produced by the decoders 4b and 4c have an excitation ratio of 1:1 (one phase excitation: two-phase excitation). However, this excitation ratio might cause mechanical vibrations in the stepping motor 1 and its peripheral elements if the combination of the excitation ratio and a mechanical structure of the facsimile machine is not appropriate.

In such a case, the excitation phase Q5 produced by the variable excitation phase generating circuit 8 is output to the driver 2 from the selector 3 instead of the excitation phases Q3 and Q4.

Since the variable excitation phase generating circuit 8 can produce an excitation phase Q5 for the one-two phase excitation of desired excitation ratio having different one and two-phase excitation periods, as described earlier with reference to FIGS. 9 and 10, the selection of an appropriate excitation ratio with respect to the mechanical characteristics of the facsimile machine causes no vibrations in the stepping motor 1 and its peripheral elements.

As a result, it is possible to carry out the image scan-reading or printing by the facsimile machine without trouble-causing mechanical vibrations. This improves the scanning resolution and the printing quality.

In the above described embodiment, not only the excitation phases Q3 and Q4 of fixed excitation ratios but the excitation phase Q5 of desired excitation ratio which is different from those of the phases Q3 and Q4 are produced, the present invention is not limited to such a combination.

The illustrated embodiment includes three kinds of table decoders 4a to 4c, but the number of decoders is arbitrary in this invention as long as more than one decoders are provided. Further, a type of excitation phase produced by the decoder is not limited in the present invention. It is satisfactory if the decoders can produce different excitation phases.

In addition, required to the present invention is a structure that at least one pulse rate generating circuit is used by a plurality of decoders in combination. Thus, when another pulse rate generating circuit is added, this circuit may or may not be used by a plurality of decoders in combination. This will depend on design preference.

Figure 11:
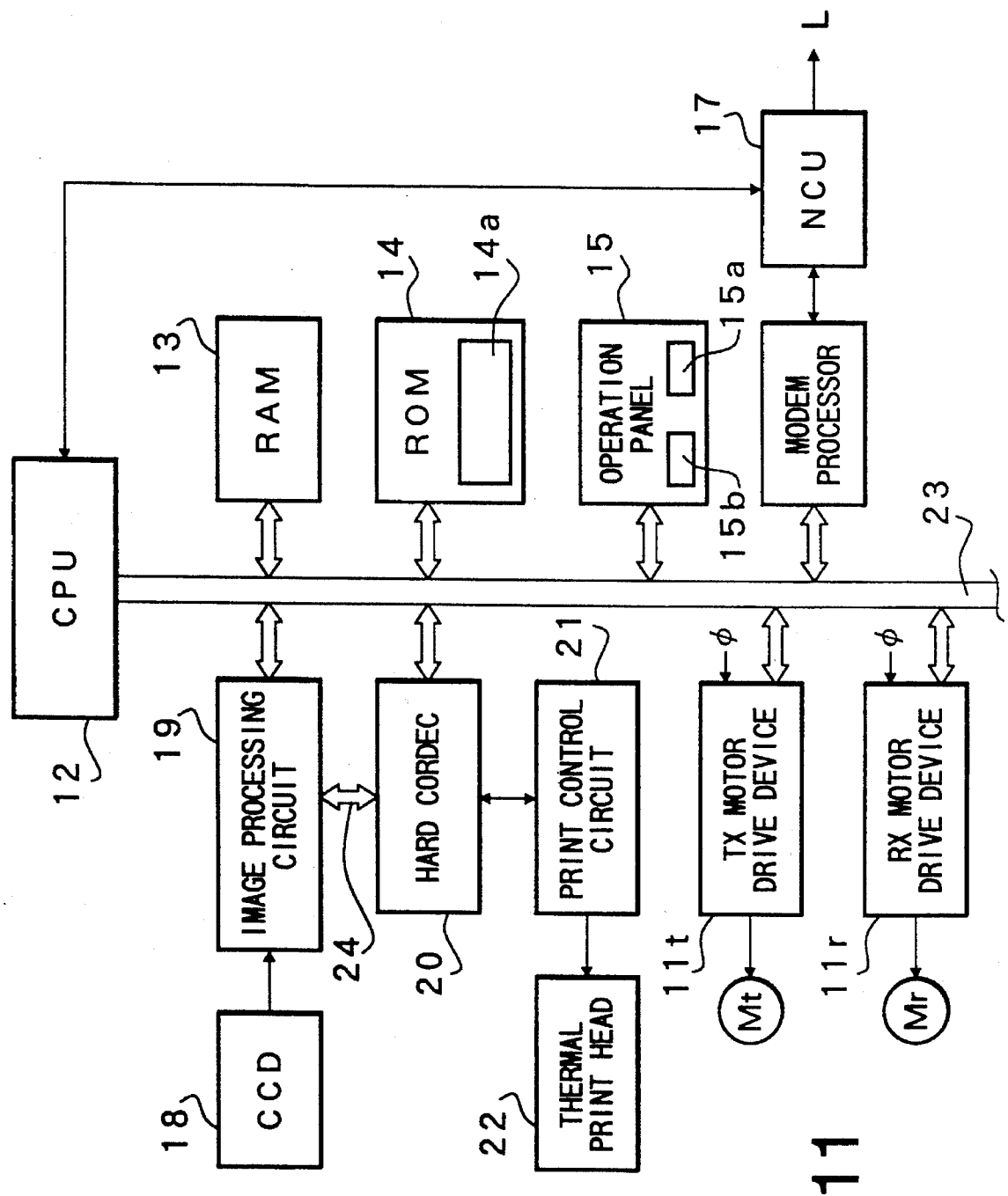
FIG. 11 illustrates a block diagram of a facsimile machine in which a motor driver arrangement of the embodiment is incorporated.

Referring to FIG. 11, illustrated is a block diagram of a facsimile machine employing motor drive devices of the present invention. Numeral 12 designates a CPU which performs the control of the facsimile machine. Connected to the CPU 12 via a system bus 23 are an image processing circuit 19, a hard codec (coder+decoder) 20, a RAM 13, a ROM 14, an operation panel 15, a modem processor 16 and the motor drive devices 11t and 11r of the present invention. The motor drive device 11t is used for the data transmission (TX), i.e., it drives a stepping motor Mt which feeds a document in the sub-scanning direction. On the other hand, the motor drive device 11r is used for the data reception (RX), i.e., it drives a stepping motor Mr which feeds a thermosensitive recording paper in the sub-scanning direction.

The image processing circuit 19 performs shading correction and gamma correction to an analog video signal sent from the CCD 18 and then binary codes it. The hard codec 20 compresses a bit image data sent from the image processing circuit 19 via an image bus 24 using a coding method such as MH, MR or MMR. The hard codec 20 also decodes the coded image data sent through the system bus 23 to a binary image data and outputs the binary image data to the print control circuit 21. The print control circuit 21 supplies the binary image data to a thermal print head 22 to heat and drive the thermal print head 22.

The RAM 13 temporarily stores various data. The ROM 14 stores a control program for the CPU 12 and various fixed data. The fixed data include data 14a about the above mentioned delay times, excitation ratios and excitation methods for the data transmission and reception in the normal and fine modes. These data are simply called "motor data" hereinafter.

A ten-key and other keys such as a start key 15a and a mode selection key 15b are provided in the operation panel 15. The modem processor 16 has a function of modulating/demodulating the coded image data (CCITT Recommendation V.27 ter, V.29, V.17), a function of transmitting/receiving a communication procedure signal (CCITT Recommendation, V.21, T.30) and a function of generating a DTMF. An NCU 17 connects/disconnects a telephone line L with/from the modem processor 16. The CPU 12 also controls the NCU 17.

Figure 12:
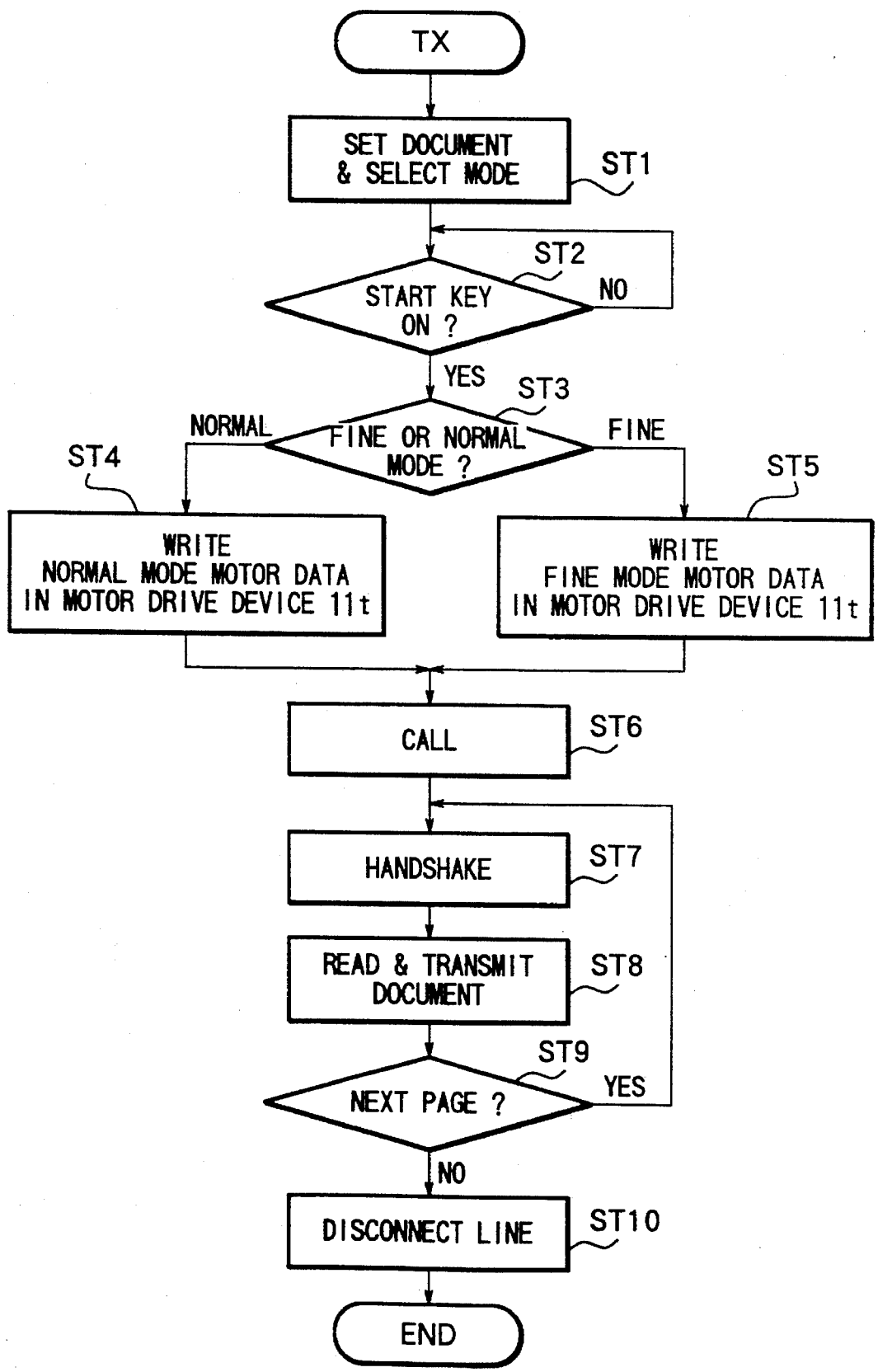
FIG. 12 is a flowchart showing one example of transmission procedure by the facsimile machine of FIG. 11.

FIG. 12 illustrates a flowchart of data transmission process of the facsimile machine. First, an operator sets a document in a document support (not shown) and selects a transmission mode, i.e., a normal mode or a fine mode, by pressing the mode selection key 15b (ST1). Next, when the operator presses the start key 15a, the CPU 12 starts the data transmission (ST2). The CPU 12 judges whether the selected mode is a normal mode or a fine mode (ST3). If the CPU 12 judges that the normal mode is selected, the CPU 12 reads motor data for the normal mode (for transmission) from the ROM 14 and writes it into the register 9 off the motor drive device 11t (ST4). On the other hand, if the CPU 12 judges that the fine mode is selected, the CPU 12 reads the motor data for the fine mode (for transmission) from the ROM 14 and writes it into the register 9 of the motor drive device 11t (ST5).

Next, the CPU 12 outputs a call command to the NCU 17. The NCU 17 connects the modem processor 16 with the telephone line L and sends a DTMF tone into the telephone line L (ST6).

When the line L is connected with a facsimile machine of another station, the CPU 12 conducts a handshake via the modem processor 16 (ST7). After the handshake, the document is read and transmitted to the facsimile machine of another station (ST8). Specifically, upon the motor drive command from the CPU 12, the motor drive device 11t drives the stepping motor Mt in accordance with the data written in the register 9. The stepping motor Mt feeds the document with a pitch of normal or fine mode. The CCD 18 reads the document and the image processing circuit 19 converts the analog video signal of the CCD 18 to a binary bit image data. The hard codec 20 codes the bit image data and the CPU 21 transfers the coded image data to the modem processor 16. The modem processor 16 modulates the image data and outputs it on the telephone line L.

The CPU 12 judges whether the next document is set in the document support (ST9). If there is another document, the program returns to step ST8. Otherwise, the program proceeds to step ST10. At step ST10, the CPU 12 outputs a line disconnection command to the NCU 17 and the NCU 17 disconnects the modem processor 16 from the telephone line L.

Figure 13:
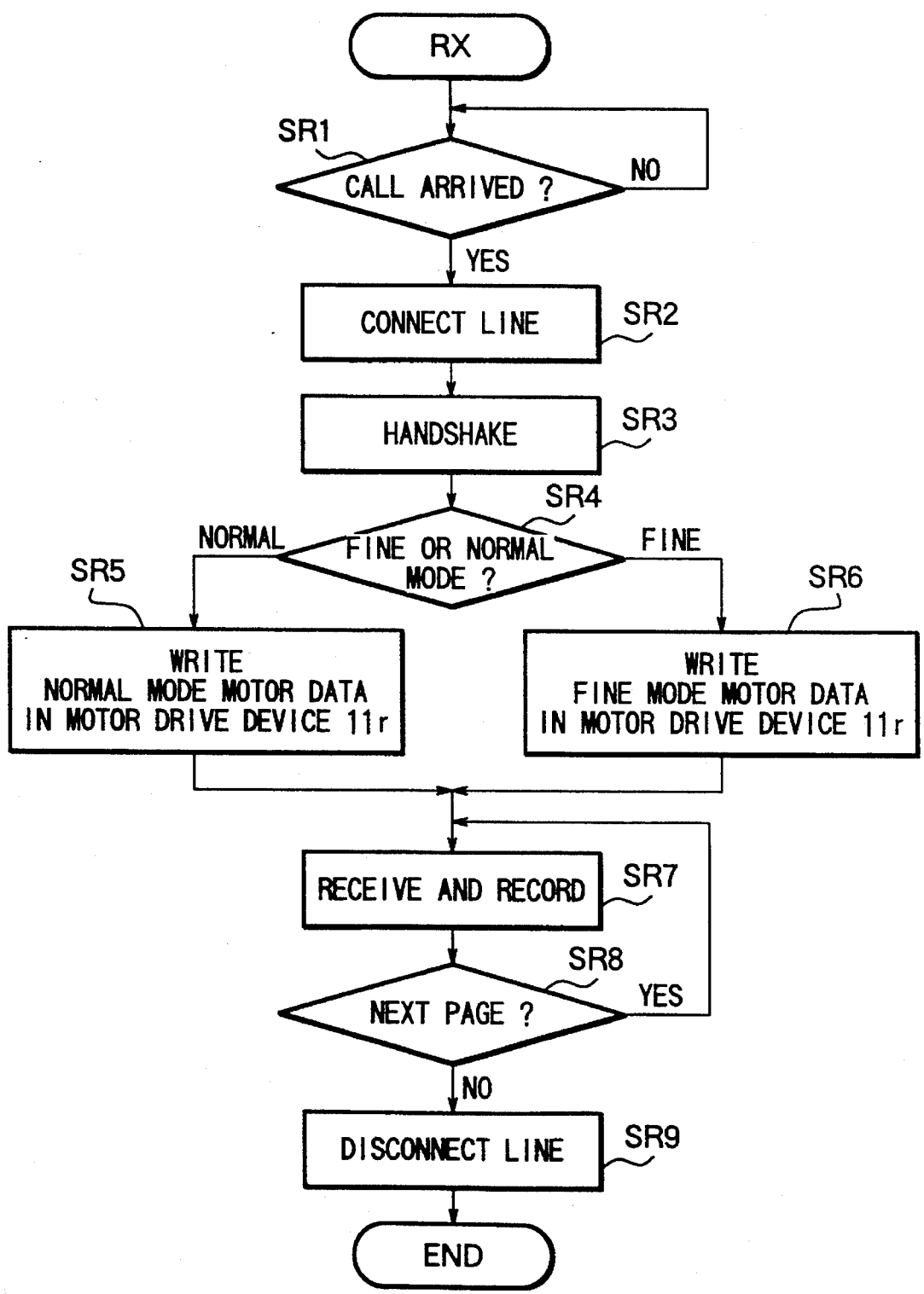
FIG. 13 is a flowchart showing one example of reception procedure by the facsimile machine of FIG. 11.
Figure 14:
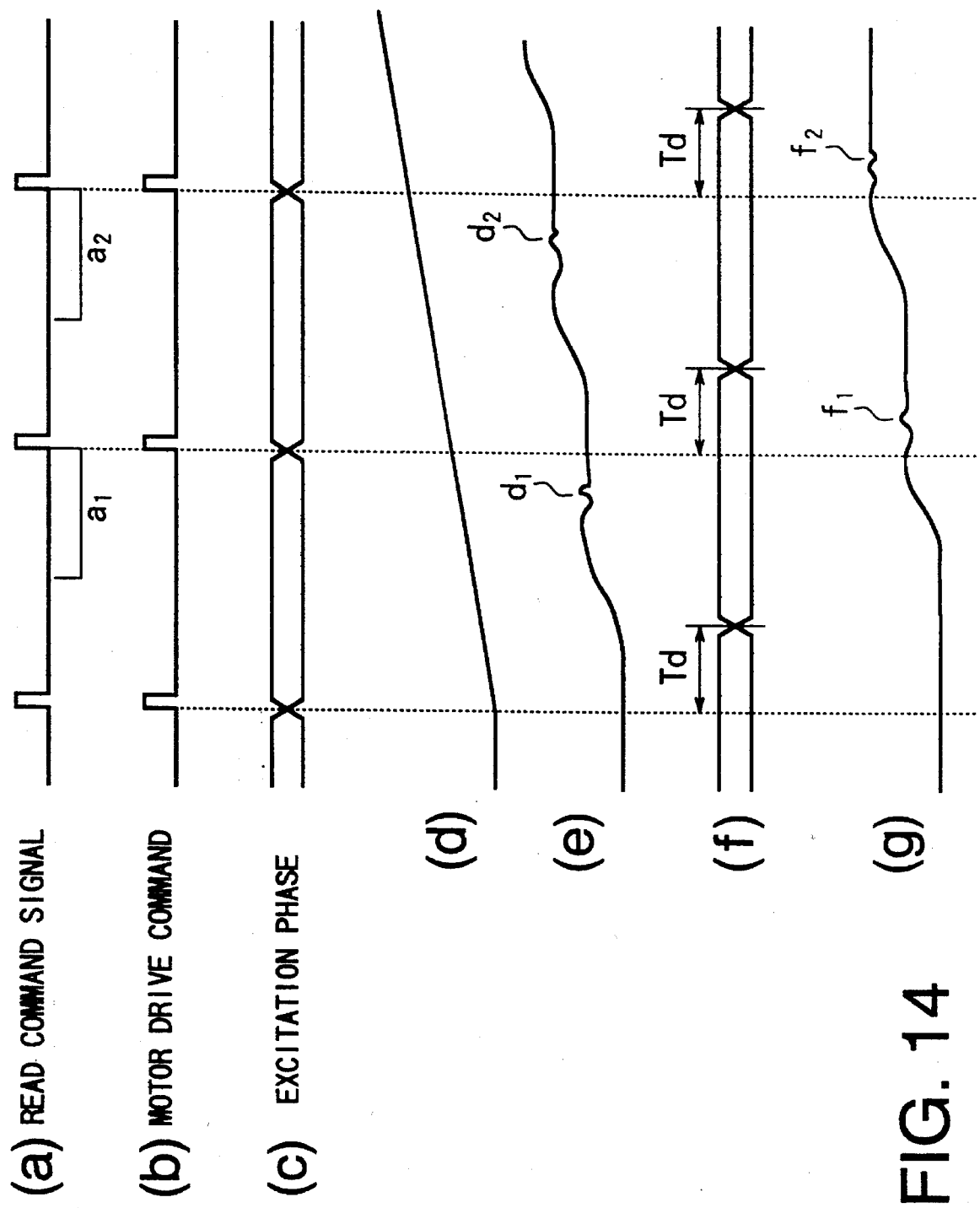
FIG. 14 is a time chart useful to explain the delay time of the motor drive arrangement.

FIG. 13 shows the reception process of the facsimile machine. The CPU 12 monitors whether a call signal comes in the telephone line L via the NCU 17 (SR1). If the CPU 12 detects the calling signal, it outputs a line connection command to the NCU 17 and the NCU 17 connects the modem processor 16 with the telephone line L (SR2). The CPU 12 performs the handshake via the modem processor 16 (SR3). The mode is determined at the handshake. When the mode is a normal mode, the CPU 12 reads motor data for the normal mode (for reception) from the ROM 14 and writes it into the register 9 of the motor drive device 11r (SRs 4 and 5). On the other hand, when the mode is a fine mode, the CPU 12 reads data for the fine mode (for reception) from the ROM 14 and writes it into the register 9 of the motor drive device 11r (SRs 4 and 6). Then, the image data is received and recorded on the thermosensitive recording paper (SR7). Specifically, upon receiving the motor drive command from the CPU 12, the motor drive device 11r drives the stepping motor Mr in accordance with the data written in the register 9 and feeds the thermosensitive recording paper with a pitch of normal or fine mode. The CPU 12 transfers to the hard codec 20 image data demodulated by the modem processor 16. The hard codec 20 outputs to the print control circuit 21 bit image data which is obtained by decoding the image data. The print control circuit 21 heats and drives the thermal print head 22 to record the image on the thermosensitive recording paper.

Upon completion of one page reception and printing, the CPU 12 judges whether there is a next page. If YES, the program returns to step SR7. Otherwise, the program advances to step SR9. At step SR9, the CPU 12 outputs a line disconnection command to the NCU 17 and the NCU 17 disconnects the modem processor 17 from the telephone line L.

The above example deals with a facsimile machine having two modes (normal and fine modes), but the present invention may be applied to a facsimile machine having three modes (normal, fine and superfine modes).

It should be noted that the field of use of the motor drive device of the present invention is not limited to the facsimile machine. For instance, the present invention may be applied to a scanner or a printer which needs the elimination of mechanical vibrations due to a motor.

As understood from the above description, the motor drive device of the present invention has the following technical advantages:

Even in a case where the motor drive device of the present invention is applied to various kinds of facsimile machine, it is possible to individually set the motor actuation delay and the excitation ratio for a particular type of the facsimile machine to prevent large vibrations from occurring in the facsimile machine. Further, a single motor drive device can cope with various kinds of facsimile machine so that a problem of the prior art, i.e., a plurality of motor drive devices is required for a plurality of facsimile machines, is eliminated. This improves the manufacturing efficiency.

In addition, since an operator can determine by the selection of delay time when the motor should start operating or the motor should start rotating, it is possible to stop the motor during the document scanning or the printing. Accordingly, the scanning and the printing can be carried out without mechanical vibrations. This improves the scanning resolution and the printing quality.

We claim:

1. A motor drive device, comprising:

a first excitation phase generating circuit for generating a first excitation phase for a one-two phase excitation having a first excitation ratio, a second excitation phase generating circuit for generating a second excitation phase for a one-two phase excitation having a second excitation ratio, the second excitation ratio differing from the first excitation ratio based upon the excitation phase output from the first excitation phase generating circuit, and a driver for receiving at least one of the first and second excitation phases.

* * * * *